Figure 16:
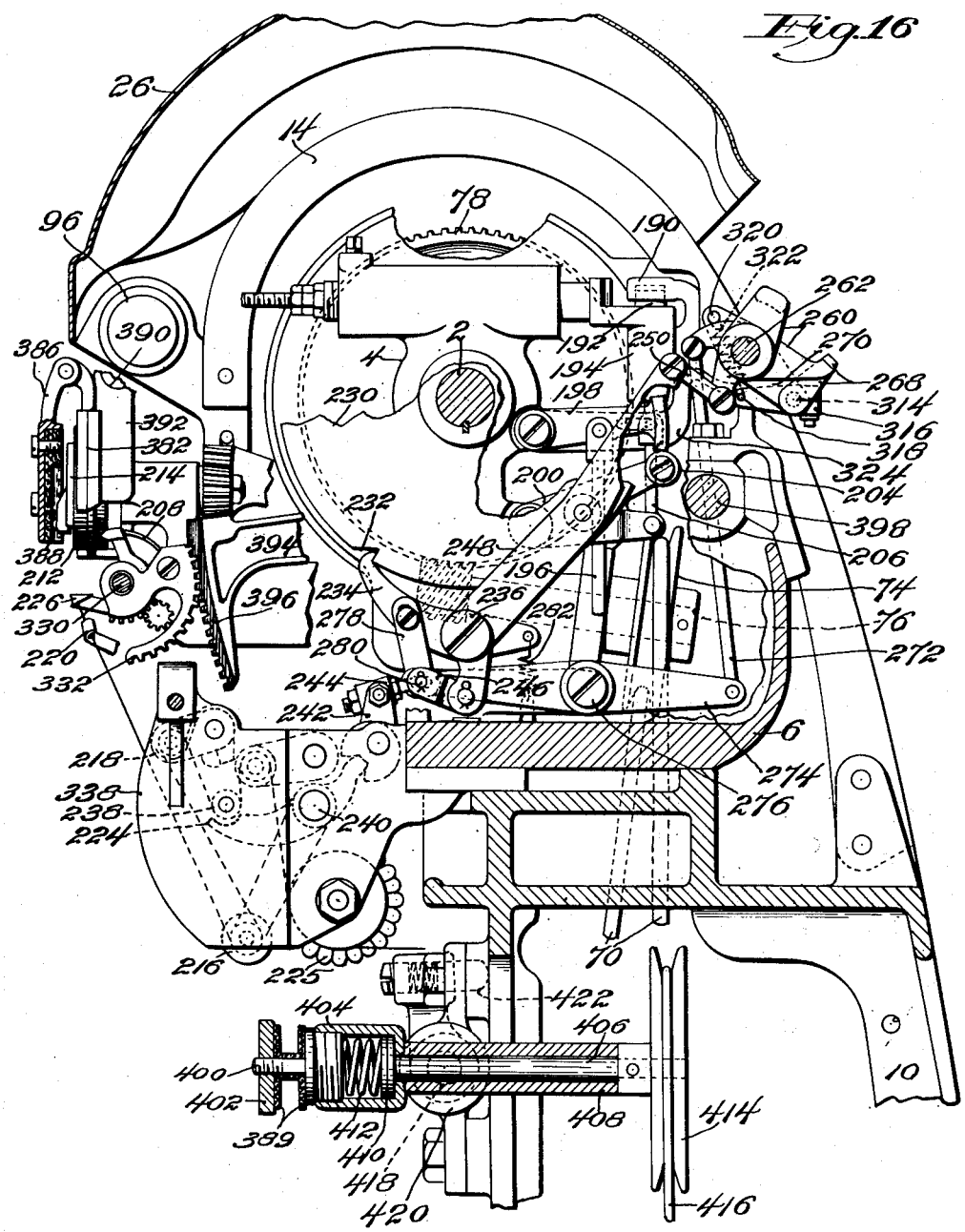

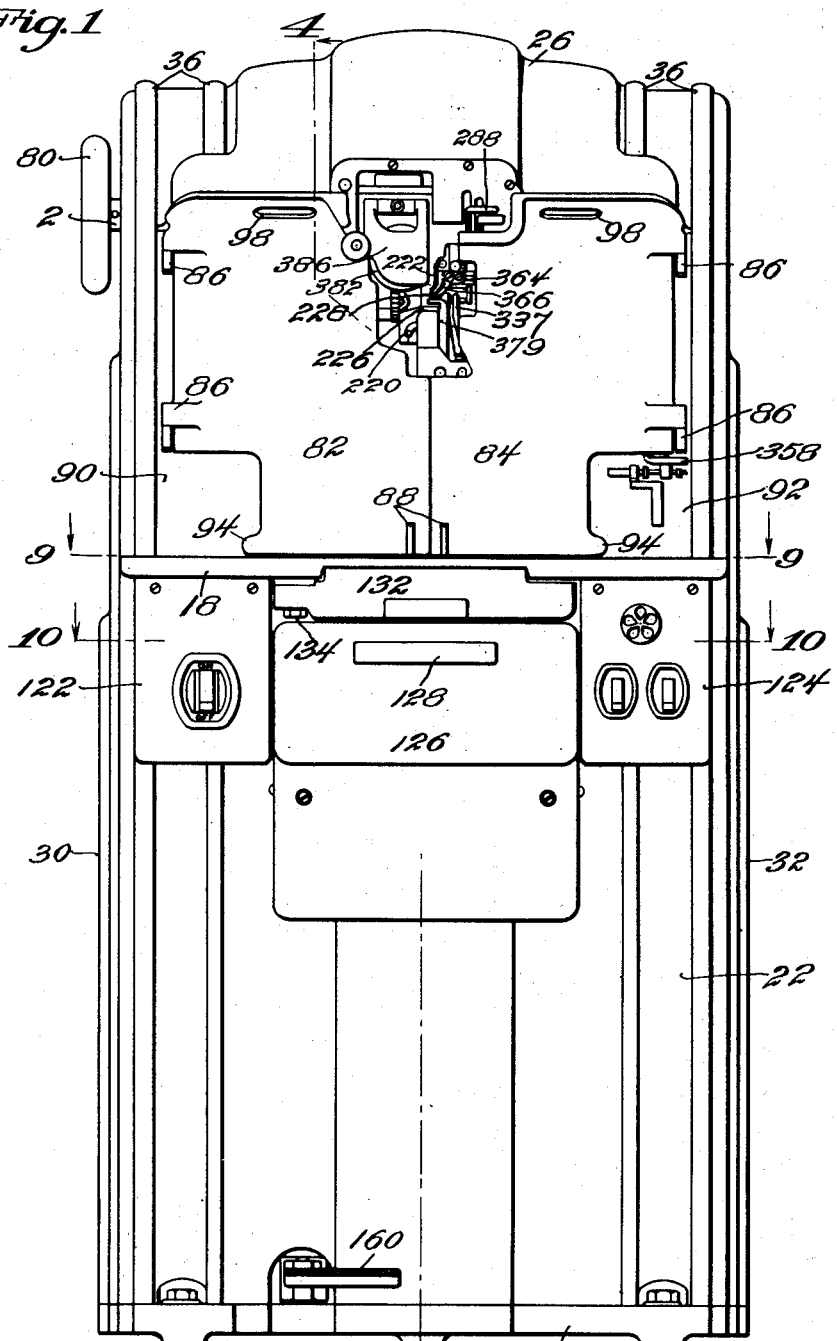

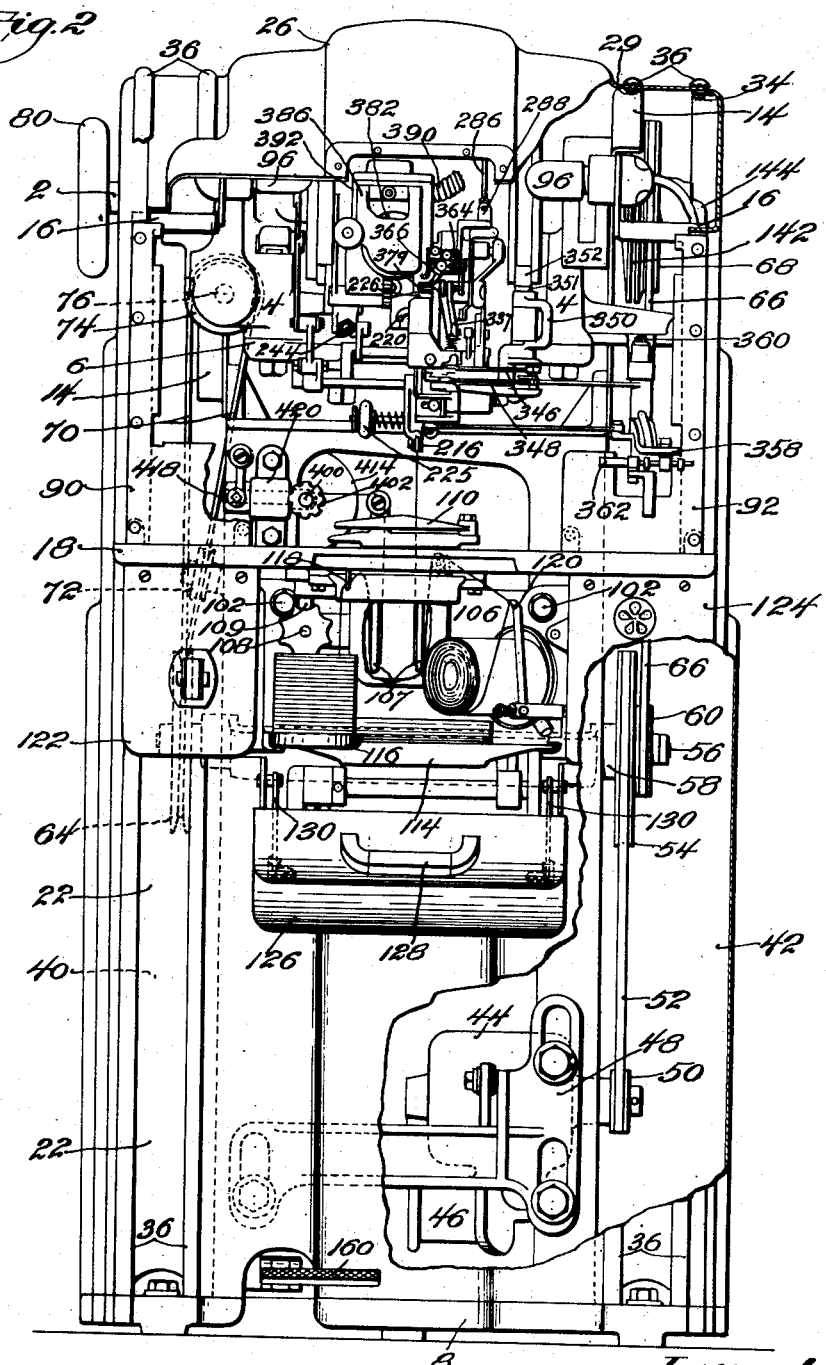

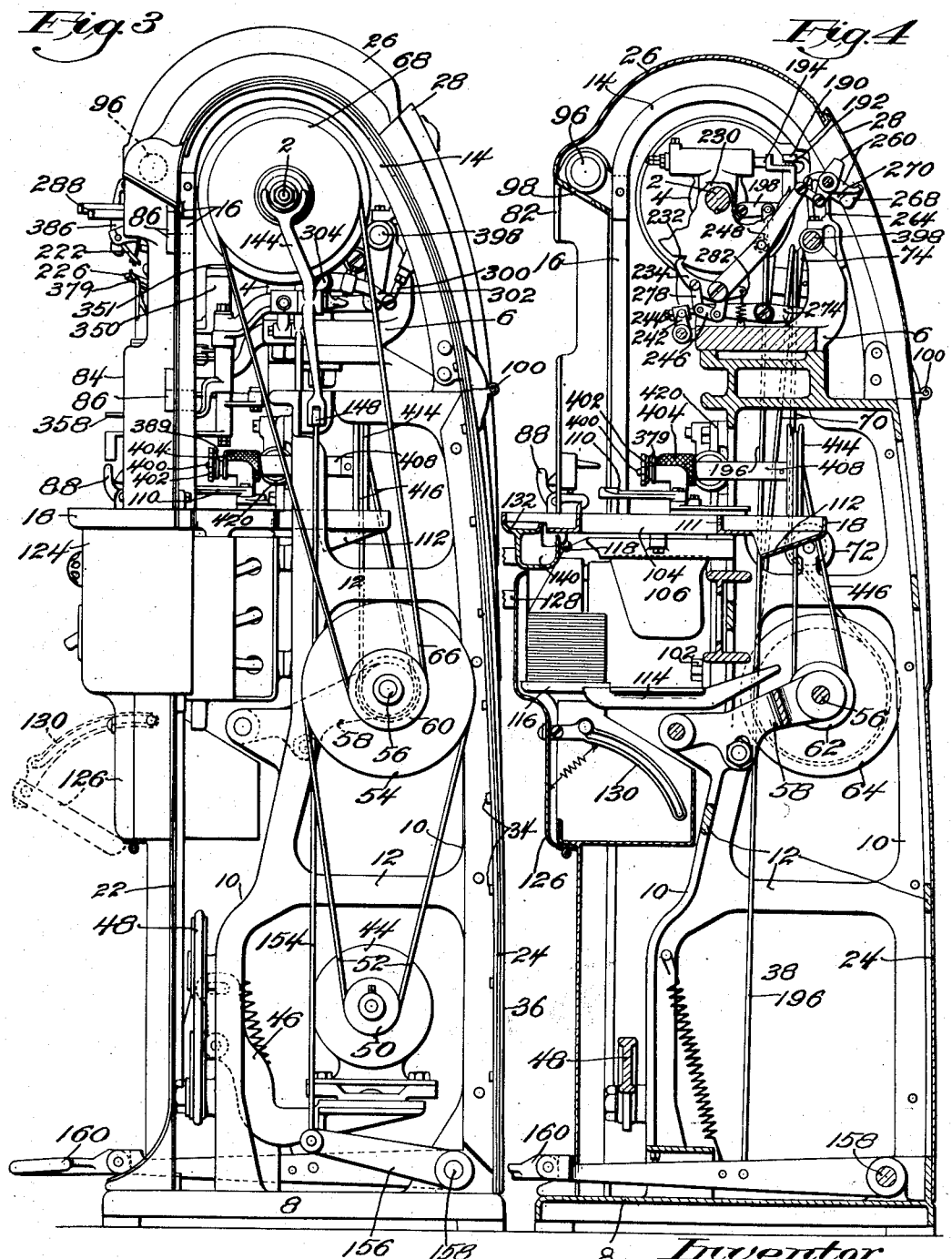

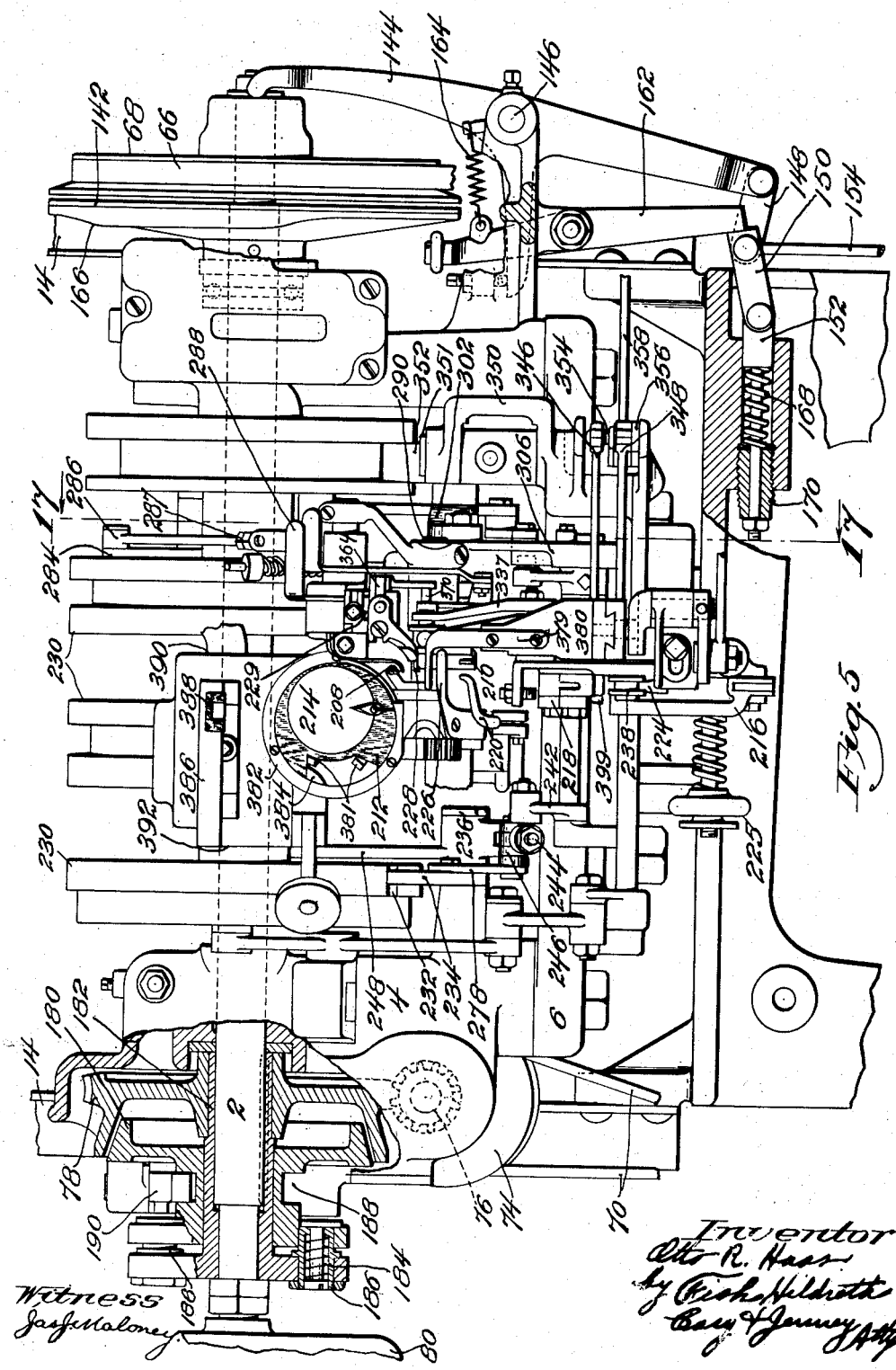

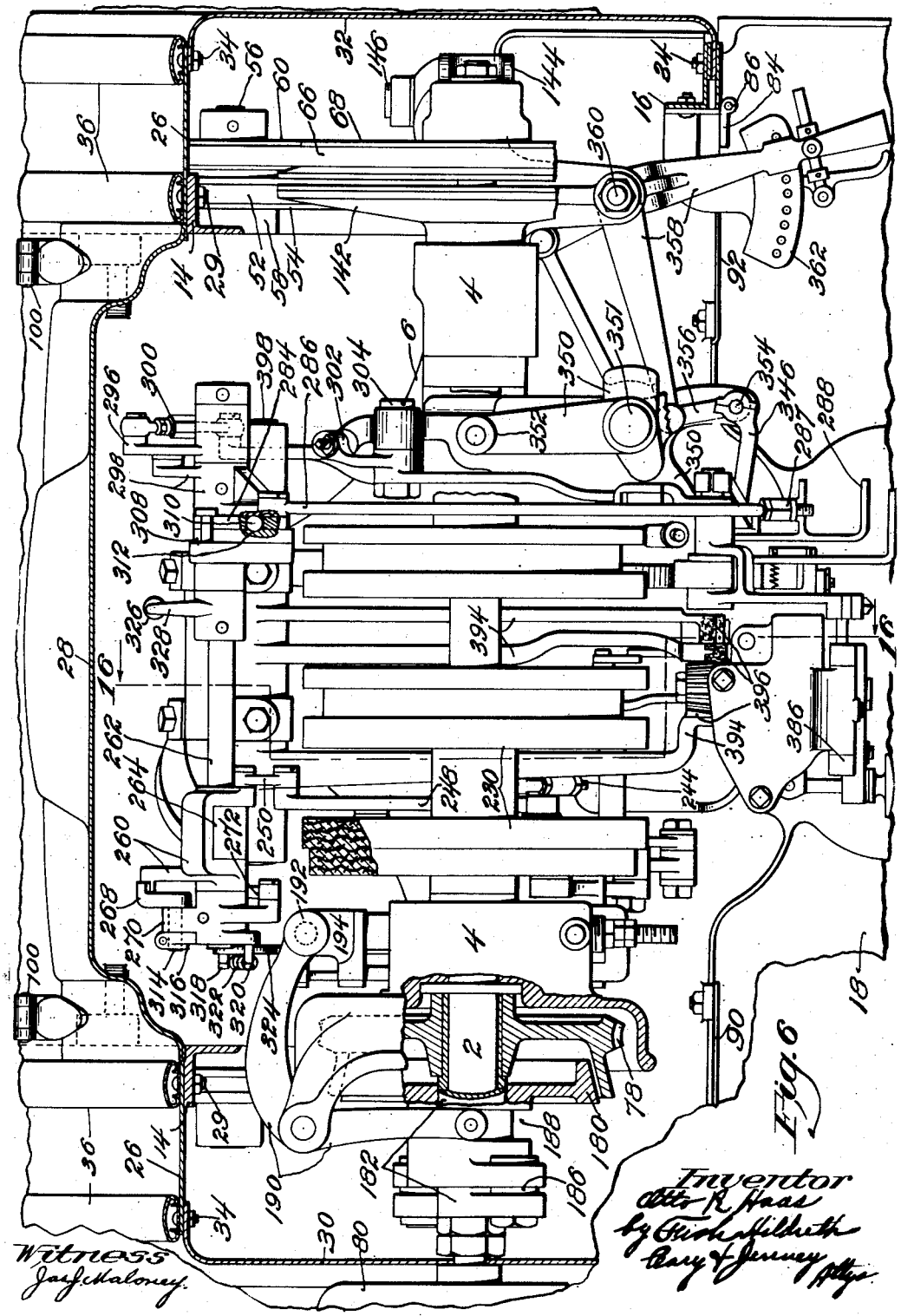

Aug. 31, 1943.   O. R. HAAS   2,328,011
SHOE SEWING MACHINE
Filed Sept. 14, 1939   10 Sheets-Sheet 6
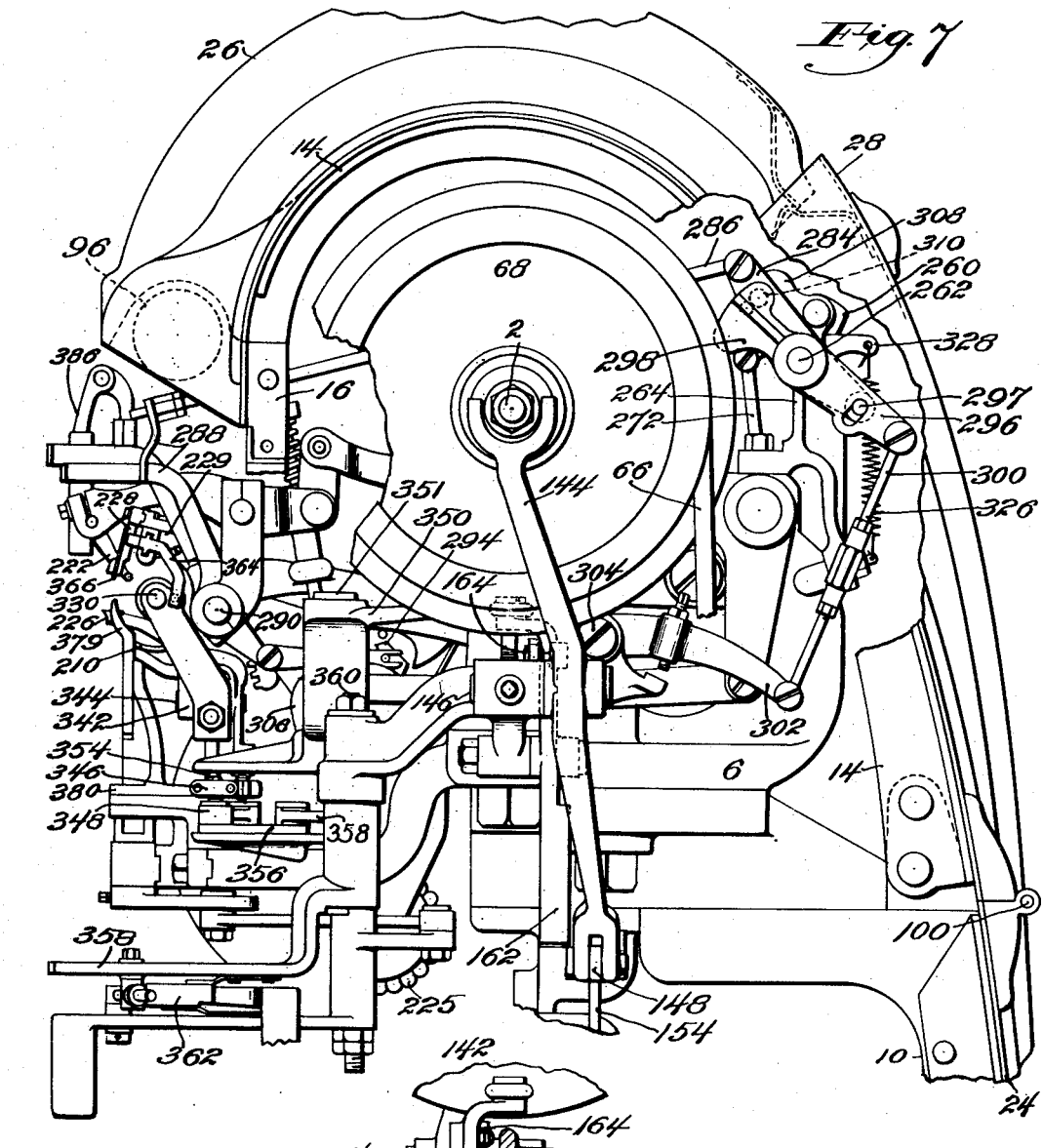
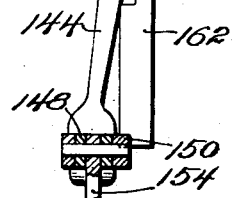

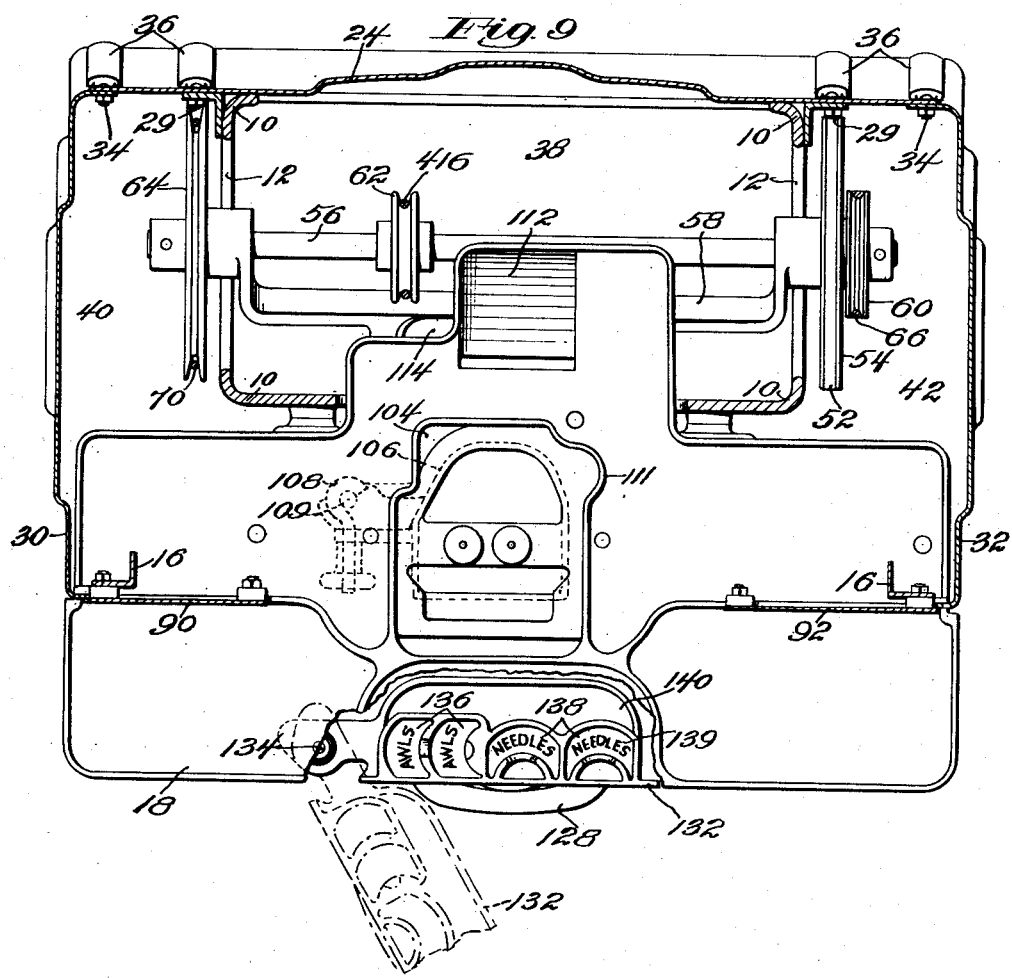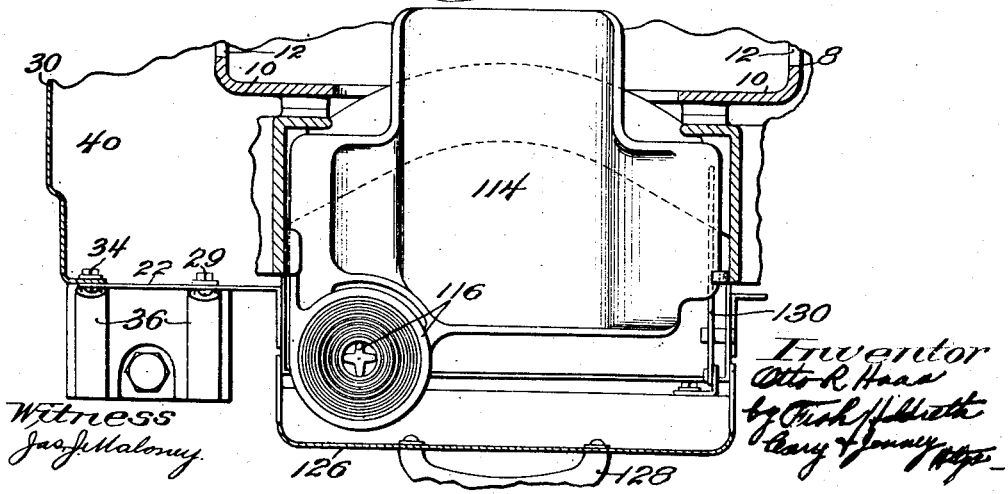

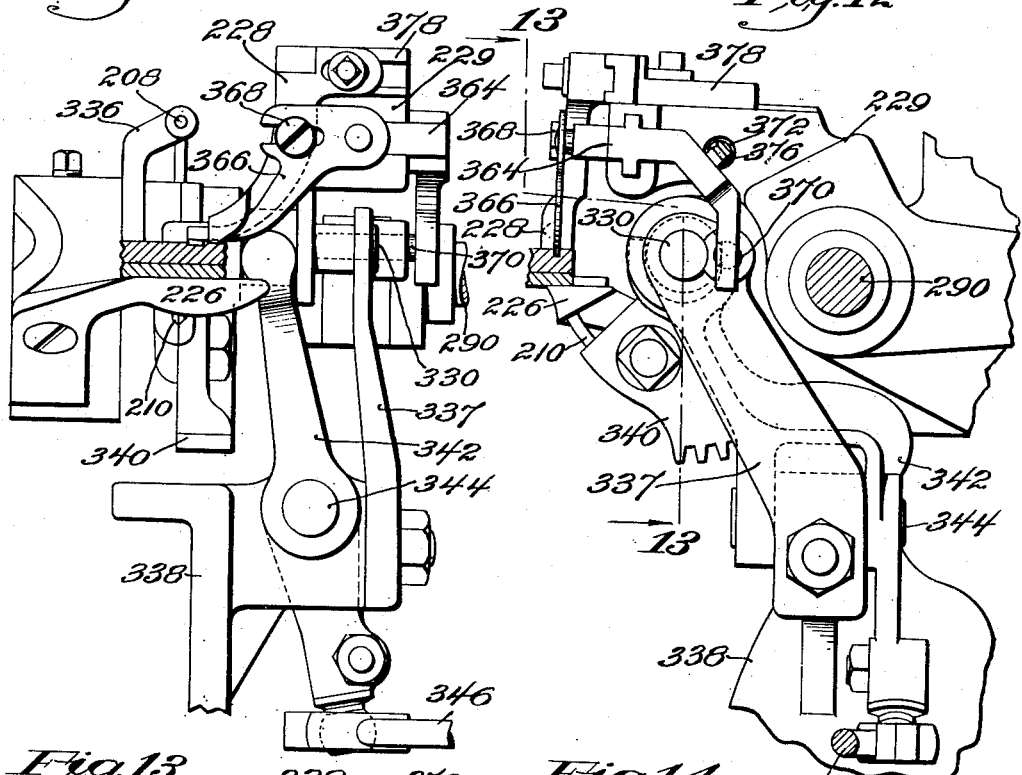

Aug. 31, 1943.   O. R. HAAS   2,328,011
SHOE SEWING MACHINE
Filed Sept. 14, 1939   10 Sheets-Sheet 9

Aug. 31, 1943.   O. R. HAAS   2,328,011
SHOE SEWING MACHINE
Filed Sept. 14, 1939   10 Sheets-Sheet 10

Witness
Jas. J. Maloney.

Inventor
Otto R. Haas

Patented Aug. 31, 1943

2,328,011

UNITED STATES PATENT OFFICE 2,328,011

SHOE SEWING MACHINE

Otto R. Haas, North Beverly, Mass., assignor to United Shoe Machinery Corporation, Borough of Flemington, N. J., a corporation of New Jersey Application September 14, 1939, Serial No. 294,926

18 Claims. (Cl. 112—258)

The present invention relates to shoe sewing machines and more particularly to improvements in such machines and mechanisms including features relating to arrangements of parts which render the machine capable of being entirely enclosed with a protective and ornamental cover structure except for those parts which actually engage the work during sewing.

Due to the necessity of frequent manipulation and adjustment, and to the crowded relation of the stitch-forming devices of a shoe sewing machine, it has been found impractical heretofore to entirely enclose the working parts and frames of such machines with a protective or ornamental casing. Previous shoe sewing machines have been provided with quickly removable covers over the top or at the sides, but other portions of the machine have been left exposed for convenient access so that accumulation of dust and foreign materials on the working parts of the machines can not be avoided. Furthermore, unless the entire machine is enclosed, it is difficult, if not impossible, to provide a cover structure which will be symmetrical in shape and will match the design of cover structures for other types of shoe machines which are employed in the same room with the sewing machine, thereby marring a uniform ornamental effect frequently desired in shoe repair rooms or modern shops.

An object of the present invention is, therefore, to provide a frame and cover construction for a shoe sewing machine arranged to support a completely enclosing casing so that all foreign materials will be excluded from the working parts of the machine while permitting convenient exposure when necessary of certain parts to which access must frequently be provided. Other objects of the invention are to simplify and improve the construction and arrangement of the operating parts of a sewing machine in order to render the mechanisms more reliable and effective in operation than heretofore, thus obviating to a large degree the necessity of frequent adjustments or replacements requiring removal of the enclosing casing.

With these and other objects in view, the present invention contemplates the provision in a shoe sewing machine having a main frame of substantially rectangular cross section formed with vertical supporting posts in which the stitch-forming devices are disposed at the front of the frame, of symmetrical front and rear cover structures supported directly by the frame and arranged to extend laterally beyond the frame with one or more separate end plates secured to the laterally extending portions of the front and rear cover structures to fully enclose the machine and to form a compartment for driving belts and pulleys. The parts of the casing are held together and to the rear frame of the machine, according to this feature of the invention, by separate parallel lines of fastenings so that ornamental protecting strips for the exposed ends of the fastenings may be secured thereto. To render the stitch-forming devices and driving compartment accessible for limited manipulation and adjustment, in the form of the invention illustrated, one or more forwardly swinging doors are provided hinged to the cover structure outside the line of attachment for the cover structure on the frame so that when the doors are opened, the driving belts and pulleys are exposed. Further features relating to the casing structure include lighting means for the stitch-forming devices arranged to be protected by a perforated flanged portion of one or more of the forwardly swinging doors when the doors are closed and to a combined helf, wax pot and thread supply assembly arranged to be attached as a unit during construction of the machine so that proper adjustments and alignment between the parts may be made while the machine is disassembled and retained in proper relation after assembly with the casing in place.

Other features of the invention include novel and improved constructions, arrangements, and combinations of parts, hereinafter described and claimed which, together with the advantages to be obtained thereby, will be readily understood by those skilled in the art from the following description taken in connection with the accompanying drawings.

Figure 17:
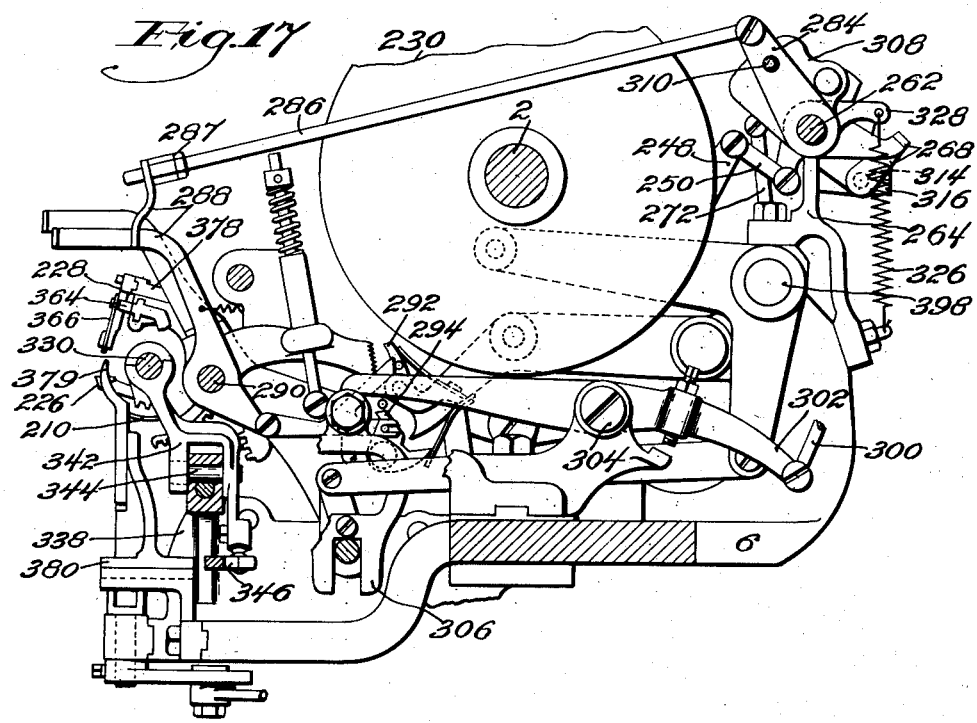
Figure 18:
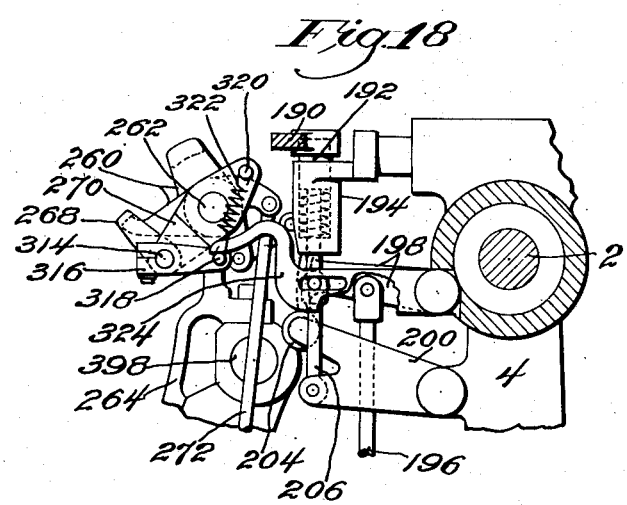

In the drawings, Figure 1 is a view in front elevation of a machine embodying the present invention with its enclosing casing in place; Figure 2 is a front view of the machine with a portion of the enclosing casing broken away to illustrate the underlying parts; Figure 3 is a side view, looking from the right of the machine with the right end plate of the casing removed; Figure 4 is a sectional view of the machine, taken along the line 4—4 of Figure 1; Figure 5 is a front view on an enlarged scale of the sewing head of the machine, the casing being removed and portions of the frame broken away; Figure 6 is a plan view on a similar scale with the casing shown in section; Figure 7 is a sectional view of the sewing head with the right end plate removed; Figure 8 is a detail view of a portion of the driving and stopping mechanism shown in Figure 7, looking from the reverse side; Figure 9 is a sectional plan view of the machine, taken along the line 9—9 of of Figure 1; Figure 10 is a further sectional plan view of a portion of the machine taken along the line 10—10 of Figure 1, indicating a sliding drip tray; Figure 11 is a detail view on an enlarged scale of the needle and awl supporting stud and presser-foot with work grooving knife; Figure 12 is a side view of the same parts; Figure 13 is a sectional view of the same parts as viewed along line 13—13 of Figure 12; Figure 14 is a plan view of parts illustrated in Figure 11; Figure 15 is a partial sectional view, taken along the line 15—15 of Figure 14; Figure 16 is a right hand side sectional view of the parts at the front of the sewing head of the machine, as viewed along the line 16—16 of Figure 6; Figure 17 is a sectional view of the sewing head taken along the line 17—17 of Figure 5; and Figure 18 is a detail of some of the parts indicated in Figure 16, as viewed from the opposite side of the machine.

The illustrated machine is a lockstitch outsole shoe sewing machine of the same general construction and mode of operation as that disclosed in U. S. Letters Patent to French and Meyer No. 473,870 of April 26, 1892, and is provided with stitch-forming devices actuated by means of a single main sewing shaft rotated by a power driven belt engaging a pulley on the shaft. In order to protect the operator of the patented machine from contact with the moving parts, it is the usual practice to cover the driving belt and certain of the more exposed operating mechanisms with separate detachable guards so that the covered parts may be exposed for adjustment or replacement when necessary without difficulty. With the use of separate guards, the means for fastening the guards to the main frame of the machine may increase the strain applied to the frame to an undesirable extent, and it is impossible to construct the machine with a symmetrical appearance.

Referring more particularly to the machine illustrated in the drawings, the main sewing shaft is indicated at 2, and is supported horizontally in bearings at the upper ends of upright members 4, bolted at their lower ends to a bed plate 6 (see Figs. 3, 4 and 5) mounted on a main frame having a generally rectangular horizontal cross section, as shown in Fig. 9, and comprising a base 8 and four spaced vertical corner posts 10 formed with cross struts 12. At the rear of the frame near its upper end there are mounted a pair of forwardly curving frame members 14, the forward ends of which are secured to the upper ends of a pair of offset vertical braces 16, shown in Figs. 2, 3 and 6. The braces 16 extend downwardly and are secured at their lower ends to a fixed shelf 18 extending from the machine frame. The fixed parts thus far referred to constitute the main frame of the machine and are so arranged as to form a continuous support extending outside all of the operating parts of the machine with the exception of the actual work engaging portions of the stitch-forming devices which are exposed at the front of the machine frame.

The enclosing cover structure for the machine, according to the present invention, comprises front and rear casing members 22, 24, 26 and 28 (see Fig. 3) supported directly by the vertical posts 10 and by other portions of the main frame. The casing members 24 and 26 are secured to the frame by parallel lines of fastening screws 29, and extend laterally beyond the frame, as shown in Figs. 2, 6 and 9. The sides of the machine are enclosed by end plates 30 and 32 secured to the laterally extending portions of the front and rear casing members by lines of fastening screws 34 parallel also to the lines of screws 29. Also secured in place by the screws 29 and 34 are suitable ornamental cover strips 36. The casing member 26 is formed with a sweeping front to rear curvature covering the head of the machine with suitable terraced formation to provide an artistic effect. Inside the cover structure, the supporting posts 10 and struts 12 of the main frame of the machine divide the space inside the cover structure into a central compartment 38 (see Fig. 9) and end compartments 40 and 42 for the main driving pulleys and belts.

Referring to Figs. 2, 3 and 4, the main driving motor is indicated at 44 mounted on a support 46 which, in turn, is pivoted to an L-shaped slotted plate 48 adjustable vertically on the two front posts 10 in the lower part of the frame. The support 46 and the motor 44 are within the central compartment 38, the end of the motor shaft and its driving pulley 50 only extending into the right end compartment 42. The driving pulley 50 is surrounded by a belt 52 carried by a pulley 54 secured to a horizontal counter-shaft 56 in bearings parallel to the sewing shaft formed in a swinging bracket 58. The counter-shaft 56 also carries pulleys 60, 62 and 64 for high and low speed driving and stopping mechanisms mounted in the head of the machine and for a bobbin winder. In the right-hand driving compartment 42, the pulley 60 is engaged by a high speed driving belt 66 from which is driven a loose pulley 68 on the sewing shaft 2 forming the driving member for a high speed clutch. In the left-hand driving compartment, the pulley 64 is engaged by a low speed driving belt 70 passing along an idler pulley 72 rotatably mounted on the machine frame and over a driven pulley 74 carried by a worm shaft 76 (see Fig. 16) engaging a worm wheel 78 loose on the main sewing shaft. The low speed stopping mechanism is similar to that disclosed in U. S. Letters Patent to Topham No. 1,099,328, dated June 9, 1914, and the ends of the sewing shaft project laterally from beneath the frame members 14 into the driving compartments where the low and high speed driving pulleys 68 and 74 are located so as to simplify the driving connections between the pulleys and shaft. When the end plates are removed, the low and high speed driving and stopping mechanisms are rendered accessible and the end plate 30 at the left has a clearance hole through which the left end of the sewing shaft 2 projects so as to provide support for a hand wheel 80 outside the cover structure.

At the front of the machine, there are provided a pair of forwardly swinging doors 82 and 84 having vertically arranged hinges 86 mounted on the braces 16 outside the lines of attachment of the casing member 26 on the frame of the machine so that when swung forwardly, the driving compartments 40 and 42 will be accessible, as well as the actuating mechanism for the stitch-forming devices at the front of the machine. The doors 82 and 84 are cut away along their contiguous edges to expose the work engaging portions of the stitch-forming devices and to keep the doors closed, the lower edges of both doors carry latches 88 pivoted to ride over a projection on the shelf 18 and to be released by manipulating a forwardly and upwardly extending handle portion of the latches. The outside lower corners of the doors are formed with rectangular cut-away sections behind which there are mounted a pair of L-shaped shield plates 90 and 92 secured to the braces 16 and to other portions of the frame. To assist in preventing looseness in the hinges 86 and vibration in the doors, the lower outer corners of the doors are provided with tabs 94 engaging the plates 90 and 92 in such a way as to cause the parts to spring slightly before the doors are closed sufficiently to cause the latches 88 to be effective.

To illuminate the point of operation, there is mounted on the braces 16 beneath the casing member 26 a pair of lights 96. The casing member 26 is formed with a cowl-like enlargement to receive the lights and to protect the lights from accidental contact while manipulating the work, the doors 82 and 84 are formed with forwardly projected flanges having perforations 98 arranged to transmit light onto the work being sewed and to the stitch-forming devices.

The casing member 28 is in the form of a rearwardly swinging plate mounted on horizontal hinges 100 to cover or expose the sewing head of the machine at the rear. Due to the formation of the plate 28 with terraces, the hinges which are at the side edges of the plate, are so shaped that the axis of the hinges passes outside of the outermost terraced portion.

To simplify the process of construction, and to facilitate preliminary adjustment of certain parts of the machine including the wax pot, heating unit, thread supply devices and electrical controls for the machine, these parts are mounted on the shelf 18 which is formed with a horizontal portion extending outside the cover structure and a vertical portion inside the cover structure through which passes a number of bolts 102 (Fig. 2) for securing the shelf to the two forward corner posts 10. The horizontal portion of the shelf 18 has an opening 104 beneath which is mounted the wax pot indicated at 106. Secured to the under surface of the shelf is a heating unit 107 having suitable thread guides. The wax pot is releasably supported in a position surrounding the heating unit by a clamp 108 engaging a rod 109 and is so disposed that the supply of wax contained therein may readily be replenished through the opening 104 without releasing the clamp 108. To guard against contamination, a swinging cover 110 is mounted on the shelf 18 in a position to shield the opening 104 and direct foreign materials over a flange 111 surrounding the opening. The shelf 18 extends rearwardly beneath the sewing head of the machine so that oil, lint, or leather particles from the work will be deposited on the shelf. At the rear of the shelf there is formed a forwardly inclined chute 112 disposed above the rearwardly projecting portion of a drip tray 114 slidably mounted in a horizontal guideway (see Figs. 2 and 10) in the lower part of the shelf 18. The main body of the drip tray 114 is located below the wax pot 106 and is provided with a thread supply holder in the form of a spindle 116 from which thread may be guided through an eye screw 118 on the shelf into the wax pot, as indicated in Fig. 4. The drip tray 114 may be entirely removed from the machine for cleaning or for renewing the thread supply on the spindle 116, the supply carried by the spindle ordinarily being for use in rewinding shuttle bobbins.

For supplying the needle thread, a second thread supply reel support is provided in the form of a rotatable sleeve and retarding device 120 of substantially the same construction as that disclosed in U. S. Letters Patent to Winkley No. 1,909,157 dated May 16, 1933. The sleeve is so arranged that its axis extends at an angle from the rear to the front of the machine so that a fresh supply of thread may be substituted conveniently for an empty reel. Supported also from the under side of the shelf are a pair of outlet boxes 122 and 124 for the electrical equipment. With such arrangement, the parts referred to may be assembled as a unit separate from the other parts of the machine and adjusted to cooperate properly with each other without the difficulties ordinarily experienced if adjustments are made while the shelf is on the machine. To enclose the parts beneath the shelf 18, there is hinged below the shelf 18 a forwardly and downwardly swinging shield 126 having a handle 128 and slotted side links 130 arranged to limit the forward swinging movement of the shield. When the shield is in a closed position, the drip tray is held in its proper relation beneath the wax pot by the engagement of the tray with the shield at its front end and with a suitable abutment at its rear end. When opened the shield extends into a position normally occupied by the operator so that the shield must be closed before sewing operations are resumed.

To support supplies of extra needles and awls for the machine, there is mounted beneath the shelf 18 a holder 132 (see Figs. 4 and 9) for pivotal movement about a vertical stud 134 secured to the shelf and passing through one end of the holder, the head of the stud maintaining the holder in place. The holder 132 is formed with arcuate depressions 136 and 138, the depressions 136 being of the proper length to receive curved awls as employed in the machine, and the depressions 138 being of the proper length to receive curved needles. The bottom surfaces of the depressions are formed with ridges 139 formed as letters of suitable indicating words to hold the awls and needles slightly spaced from the bottom surfaces so that they may be grasped more readily by the operator after selecting the particular awl or needle desired and the marginal portions of the depressions are cut away along their central parts to further assist in picking up the selected awl or needle. The shapes of the depressions are such that the awls and needles held therein are retained in parallel relation to each other, the needle depressions being longer than the awl depressions and the awl depressions being arranged crosswise of the longest dimension of the holder while the needle depressions are lengthwise of the holder. The holder is also provided with a receptacle 140 for discarded needles and awls so that there is no necessity for scattering used needles or awls in or around the machine and its driving apparatus.

As has been stated, the high speed driving mechanism for the present machine is held from being thrown out of operation until the main sewing shaft 2 reaches substantially its normal stopping position. To engage the driving pulley 68 of the high speed driving clutch with the driven part of the clutch indicated at 142 in Figs. 2 and 5, the pulley 68 is acted upon by the upper forward end of a lever 144 fulcrumed on a pin 146 secured in the frame of the machine. The lower arm of the lever 144 is connected by a pair of toggle links 148 and 150 with the enlarged head of a bolt 152 slidingly mounted within a lug portion of the machine frame. The central joint of the toggle links is connected to the upper end of a control rod 154, the lower end of which is connected to an arm 156 secured to a shaft 158 also carrying a foot treadle 160 extending forwardly of the machine through an opening in the cover structure. When the treadle rod 154 is depressed, the lever 144 moves the clutch members 68, 142 into engagement and at the same time the link 150 which is squared at one end moves beneath a latch lever 162 which locks the toggle links in substantial alignment until released. To cause the latch lever 162 to lock the link 150, the lever is connected by a spring 164 stretched between the lever and a pin on the machine frame and, when the machine is in stopped position, the lower end of the lever is held in inoperative position by the squared end of the link 150. By locking the toggle links 148, 150, in aligned position, the control rod 154 and treadle 160 are at the same time held depressed so that the sewing shaft is driven at high speed and the low speed stopping mechanism is held from operation until such time as the toggle link 150 is released by the latch lever. To release the link 150 from the latch lever 162, the upper end of the lever carries a roll arranged to be engaged by a cam 166 on the driven clutch member 142. To render the action of the high speed clutch in starting the machine less abrupt and to prevent application of excessive pressures between the members of the clutch, the shank of the bolt 152 is surrounded by a spring 168 acting between the head of the bolt and an adjusting sleeve 170 threaded in the lug which supports the bolt.

The high speed driving mechanism of the present machine is held operative, and the low speed stopping mechanism is not operated to bring the sewing shaft to rest until after the needle and awl have become disengaged from the work in any sewing cycle. The resistance offered by the needle and awl while engaging or penetrating the work, particularly with thick work, is the greatest offered by any of the stitch forming devices during each sewing cycle and, since the resistance may vary with different qualities of work if the high speed driving mechanism becomes inoperative during the engagement of the needle and awl with the work, the sewing shaft may come to rest at an irregular stopped position. To insure that the sewing shaft will be driven positively while the needle and awl are engaging the work, the link 150 and control rod 154 are not released by the latch lever 162 until after the needle and awl are disengaged and just before that part of the rotation of the sewing shaft where the low speed stopping mechanism becomes effective. The release of link 150 and control rod 154 occurs in the present machine directly after the middle of each sewing cycle, leaving approximately a half of the sewing cycle to slow down and bring the sewing shaft to rest.

As in the low speed stopping mechanism of the Topham patent above referred to, the machine is driven at low speed by a low speed driving clutch actuated by means of a vibrating lever having an opening which is engaged by a lock bolt after the operator removes his foot from the control treadle. In the present machine, the low speed driving clutch comprises the worm wheel 78, a driven clutch member 180 splined to a sleeve 182 secured to the sewing shaft 2 and forming a bearing for the worm wheel 78. The driven clutch member 180 is normally held out of engagement with the worm wheel by means of compression springs, one of which is indicated at 184 surrounding studs secured to lugs formed on the driven clutch member 180 and slidable in sleeves 186 mounted in similar lugs formed on sleeve 182. The hub of the driven clutch member has a cam groove 188 for actuating a vibrating lever 190 (see Fig. 6). During sewing operations, the driven clutch member 180 rotates with the sewing shaft and causes the lever 190 to oscillate once during each sewing cycle and, when the high speed driving clutch is thrown out of operation, the lock bolt, shown in Fig. 16, at 192, slides vertically in a carrier 194 into an opening in the vibrating lever 190 holding the lever stationary. The cam groove 188 is so shaped that during the continued rotation of the sewing shaft, the driven clutch member 180 engages the worm wheel 78 briefly to slow down the sewing shaft and thereafter moves away from the worm wheel to permit the sewing shaft to come to a uniform position of rest. When the machine is again started, the lock bolt is withdrawn from the vibrating lever by connections with the treadle 160 including a treadle rod 196, a pivoted cam arm 198 (see Fig. 16), and a cam follower lever 200 having a roll 204 and an arm connected by means of a link 206 with the lock bolt. When the latch lever 162 locks the high speed clutch in driving engagement, it also prevents movement of the treadle and of lock bolt against the vibrating lever 190, thus holding the low speed stopping mechanism from operation. The timed relation between the cam 166 of the high speed clutch and the cam slot 188 of the low speed stopping mechanism is such that the lock bolt may not engage the vibrating lever until after the opening in the lever is in alignment with the lock bolt and just before the active part of cam slot 188 is reached, the alinement of the lever with the lock bolt occurring only while the stitch-forming devices engage the work and for a short interval thereafter. After the time in any sewing cycle when the lock bolt may engage the opening in the vibrating lever, the cam 166 allows the latch lever 162 to move under the influence of the spring 164 in a direction to lock the link 150 and the control rod 154 against upward movement so that if the low speed driving mechanism has not been rendered operative by this time, it will again be held inoperative until the next sewing cycle.

The stitch-forming devices of the machine include the curved hook needle and curved awl indicated at 208 and 210 respectively, an oscillating loop taker or shuttle 212 in which is rotatably mounted a thread case 214, main and auxiliary take-ups 216 and 218, a looper 220, a thread lifter 222, a thread clamp or lock lever 224, a tension 225, and other devices cooperating to form a lockstitch seam. The work is clamped in stationary relation to the stitch-forming devices by a work support 226 and a presser-foot 228 mounted on a presser-foot lever 229, the work being fed while released from the clamping action of the presser-foot by lateral movements of the awl, as in the machine of Patent No. 473,870. The stitch-forming devices are actuated by suitable driving connections from the sewing shaft 2 to which there is secured a series of cams 230 shaped similar to the cams of the Patent No. 473,870 referred to, and composed of synthetic resinous material as in present inventor's prior U. S. Letters Patent No. 2,037,722 of April 21, 1936. To assist further in bringing the machine to rest with the stitch-forming devices uniformly in stopping positions, one of the cams 230 has a notch 232 along its periphery arranged to be engaged by a hook member 234 pivoted on a screw stud 236 threaded in the machine. During normal sewing operations, the hook member 234 is held free of the cam which has the notch 232, the hook member being brought yieldingly into engagement with the periphery of the cam just before the stopping position is reached.

The thread lock lever 224 is similar to that disclosed in Patent No. 473,870 and is actuated to clamp and release the needle thread as it passes over a thread guiding pulley 238 in timed relation to the motions of the other stitch-forming devices. The lock lever is fulcrumed on a stud 240 and has one arm engaging a notch in the hub of an arm 242. Pivotally connected with the arm 242 is one of a pair of toggle links 244 and 246, the other one of which is pivotally connected to a cam actuated lever 248 fulcrumed on the stud 236. During normal sewing operations, the toggle links 244 and 246 are held in alignment so as to transmit the motion of the cam lever to the thread lock. The movements of the cam lever 248 are such that when the sewing shaft passes through stopping position, the thread lock is closed. To permit needle thread to be drawn freely from the machine when in stopping position, normally inoperative mechanism actuated by the cam lever 248 is provided, which when rendered operative breaks the alinement of the toggle links 244, 246.

The mechanism for breaking the alinement of the toggle links 244, 246 to release the thread from clamping engagement of the lock lever 224 also causes the hook member 234 to be moved yieldingly against the cam 230 and comprises a link 250 pivotally connected between the upper end of the cam lever 248 and an oscillating yoke 260, as best shown in Figs. 6 and 16. The yoke 260 is rotatably mounted on a rock shaft 262 supported in bearings 264 at the rear of the machine. During sewing operations, the yoke 260 is oscillated idly by the cam lever 248 and, when the latch lever 162 releases link 150 and the control rod 154, a latch arm 268 carried by one arm of a lever 270 swings into the path of movement of an arm on the oscillating yoke 260, causing the lever 270 to be actuated. When the lever 270 is moved, connections including a link 272 connected to the lever 270 and a lever 274 fulcrumed on a fixed stud screw 276 cause the alignment of the toggle links 244 and 246 to be broken so that the thread lock 224 is held open. The lever 274 is also connected with the hook member 234 through a link 278 by means of a pin 280 which passes through the central joint of the toggle links, a horizontal slot in one arm of the lever 274 and the link 278. A vertically slotted connection is provided between the link 278 and the hook member 234 so that if the connections thus described are actuated before the notch 232 on the cam 230 reaches a position opposite the hooked end of the hook member, no damage will result, the hook member being yieldingly urged against the periphery of the cam by a spring 282 stretched between an arm of the hook member and a stationary guide of the machine.

The connections for unlocking and raising the presser from the work at the end of a seam include the rock shaft 262 on which is secured the lever 270, an arm 284 (see Figs. 7 and 17) loose on the rock shaft 262, a link 286 pivotally connected at its rearward end with the arm 284 and sliding loosely at its forward end in a perforated plate portion of a presser-foot unlocking lever 288. The unlocking lever 288 is loosely mounted on the presser-foot fulcrum pin 290, and is engaged by a check nut 287 on the rod 286 to release a pair of locking pawls 292 and 294 of the presser-foot actuating mechanism in a manner similar to that disclosed in the U. S. Letters Patent to Topham No. 1,289,312, of December 31, 1918. Upon continued movement of the rock shaft 262, a slotted arm 296 loose on the shaft 262 is engaged within its slot by a pin 297 on a lever 298 fast to the shaft, the slotted lever 296 having connected to it a link 300 and a lever 302. The lever 302 is mounted on a fixed pivot 304 and overlies at its forward end the upper portion of a harp-shaped frame 306 (Fig. 17) similar to that described in Patent No. 473,870, which frame, as explained in said patent, is directly connected with the presser-foot. Through the connections thus described, the presser-foot is raised from the work after being unlocked.

To prevent continued movement of the presser-foot unlocking connections after being actuated to unlock the presser-foot, the arm 284 is operated by the lever 298 through a ball-lock connection. The arm 284 rides between a plate-like arm of the lever 298 and a fixed plate 308 secured to the bearing 264. A recess is provided in the plate-like arm of the lever 298 to receive a ball 310 sliding loosely through an opening in the arm 284, the plate 308 holding the ball partially within the recess of the lever 298 during sewing operations and, when the rock shaft is actuated, the arm 284 moves with the lever until the ball 310 lines up with a recess 312 (see Fig. 6) in the plate 308. The ball 310 then slides out of the recess in the lever 298 and into the recess 312, locking the arm 284 to the plate 308 during continued movement of the lever 298.

To actuate the latch member 268 towards and from latching relation with the arm of the oscillating yoke 260, the latch member is secured to one end of a pivot pin 314 loosely mounted in an arm of the lever 270. The other end of the pivot pin 314 carries an arm 316 having a stud 318 between which and a pin 320 on the lever 270 there is stretched a spring 322 tending to hold the latch member in latching position. When the treadle rod is depressed to start the machine, the latch member 268 is moved to inoperative position by an S-shaped arm 324 (see Fig. 18), pivoted concentrically with the cam arm 198 and connected thereto through a pin and slot connection. The free end of the arm 324 overlies the pin 318 so that when the arm 324 is moved downwardly as the treadle rod is depressed, the latch member 268 is rocked out of engagement with the arm of the yoke 260. As soon as the latch member is rendered inoperative, a tension spring 326 connected between an arm 328 secured to the shaft 262 and a fixed part of the frame rocks the shaft 262 to cause the presser-foot and stitch-forming devices to operate in the usual way.

In order to stop the machine with the last loop of needle thread partially projecting from the upper surfaces of the work so that both threads may be severed close to the upper surface of the work by a single stroke of a hand knife, the driving and stopping mechanism including the cam having the notch 232 and the hook member 234 is so arranged that the machine will come to rest before the awl enters the work for a new stitch and after the needle loop pulls the loop of needle thread from the loop taker almost to the surface of the work. The stitch setting movement of the take-up occurs after the high speed driving mechanism has been rendered inoperative and, while the sewing shaft is being driven at low speed. Also during this time the presser-foot is being lifted by the normally inoperative mechanism so that the power absorbed by these operations is provided by the low speed mechanism.

In the machine of Patent No. 473,870, a relatively long feed slide having a vertical supporting arm carrying the awl and feed slide actuating mechanism adjustable for varying the length of feeding movement are provided, mounted directly on the feed slide. Not only is the feed slide subject to unusual strain in the patented machine due to the distance between the slide portion and the mounting of the awl on the vertical arm, but the adjusting connections are so arranged that they partake of the vibratory feeding movements of the slide due to their mounting on the slide. Accurate adjustments in the length of feeding movement, therefore, are rendered inconvenient during sewing due to the vibration of the slide.

In the present machine, the awl is mounted on the same stud as the needle and is actuated through its feeding movements by the vertical feed lever fulcrumed on the frame of the machine beneath the stud and arranged to cause the awl to move along the stud in the line of feed, separate adjustable mechanism driven from the sewing shaft being provided. Referring to Figs. 11 to 15 inclusive, the needle and awl stud is indicated at 330 and is secured at its left end in a forwardly extending arm of the machine frame on which is also mounted the work support 226. The stud 330 is formed with an enlarged portion on which the needle segment 332 is rotatably mounted and a collar 334 for holding the needle segment in contact with the arm of the machine frame to prevent movement lengthwise of the segment on the stud. Surrounding the hub of the needle segment is a needle guide 336 actuated in the usual way. The reduced right end of the needle stud extends through the upper end of a supporting plate 337 bolted to a bracket 338 secured to the machine frame in place of the usual feed slide. The awl segment is indicated at 340 slidingly and rotatably mounted on the reduced end of the stud 330 and formed with a groove surrounding its hub within which is received the forked upper end of a feed lever 342 fulcrumed on a pin 344 secured in the bracket 338. The lower end of the feed lever is ball-shaped and is surrounded by a socket in a link connection 346 comprising one of a pair of inter-connected links forming the adjustable feed actuating mechanism, most clearly illustrated in Figs. 5, 6, and 7. The adjustable feed actuating mechanism also includes a link 348 universally connected at one end to the link 346 and pivoted to one arm of a feed cam lever 350 fulcrumed on a fixed vertical shaft 351. The feed cam lever carries a cam roll 352 actuated by a cam on the sewing shaft and is formed with a pair of parallel arms between which is supported a round headed stud 354 forming one member of the universal connection between the links 346 and 348. The parallel arms of the cam lever 350 act as guides for the stud 354 which is otherwise unsupported. When the stud 354 is moved between the arms of lever 350 towards and from the fulcrum shaft 351 of the lever, the length of feeding movement imparted by the lever 350 through the links 346, 348 to the feed lever 342 is increased or decreased. To hold the links in position between the guide surfaces of the lever 350, the stud 354 is connected through a link 356 to one arm of an adjusting lever 358 mounted on a pivot 360 secured in the machine frame. The other arm of the adjusting lever is formed with a handle portion exposed at the front of the cover plate 92 and rides over a fixed segmental plate 362 arranged to receive stop pins or other motion limiting means of conventional form. The arrangement of the feed adjusting connections is such that simple and rigidly joined parts are employed, the forces of action and reaction being directly applied without causing binding or other frictional disadvantages as in the machine of Patent No. 473,870. The adjusting handle of the lever 358 also remains stationary so that a more accurate control is possible.

To cut a stitch receiving groove in the work, the forwardly extending arm of the presser foot lever 229 is formed with a guideway to receive a slide 364 and the presser foot 228 has a slot at its work engaging end within which slides a flat work cutting knife 366. The upper end of the cutting knife 366 is perforated and slotted to receive a lug extending transversely of the direction of feed from the slide 364 and a shouldered guide screw 368 threaded into the presser foot 228 so that the knife is connected for movement with the slide in the direction of feed on the presser foot. To actuate the slide 364 in the direction of feed, the slide has a downwardly extending arm engaging one end of a reciprocating pin 370 slidably mounted in the plate 337 close to and at the rear of the needle and awl stud 330. The other end of the pin 370 engages an end surface of the awl segment 340 so that movement of the awl segment, while the awl is being back fed, imparts a cutting stroke to the knife 366. To insure that the knife actuating slide 364 follows closely with the feeding movements of the awl segment, a spring 372 is connected at one end to the slide 364 and at the other end to a screw 374 passing diametrically across an opening 376 in the presser foot lever 229. Suitable adjustments are provided for regulating the location of the groove cut by the knife 366 transversely of the direction of feed including a block 378 adjustably mounted for movements on the presser foot lever 229 transverse to the slide 364, to which block the presser foot 228 is secured. With this arrangement, the location of the groove cut by the knife is regulated by transverse adjustment of the presser foot on the presser foot lever.

To guide the inner edge of the work, an edge gage 379 is mounted on a short slide 380 and may be optionally connected to be adjusted forwardly and rearwardly of the machine by movement of the feed adjusting lever 358 in a manner similar to that in the machine of the Patent No. 473,870.

As in the machine of Patent No. 473,870, the thread case 214 is held from rotating with the loop taker or shuttle 212 as the shuttle is oscillated, the thread of each needle loop passing between the shuttle and its driver, and also between the thread case and the means for retaining it stationary. Referring more particularly to Figs. 5 and 16, the driver for the shuttle is indicated at 381, and is formed with two forwardly extending fingers engaging a cut-away portion or throat of the shuttle. There is a tendency in the patented machine for the thread to jam at the active points of contact between the driver and the shuttle. To avoid this difficulty and to permit easier passage of the thread about the shuttle, the main body of the shuttle in the machine of the present invention is composed of molded synthetic resin material. This material has a lower coefficient of friction with the thread, and is not effected adversely by the waxes employed.

The shuttle is rotatably mounted in a raceway 382 and is cup-shaped to receive loosely the locking thread case 214. To reinforce the shuttle body, strips of canvas or other suitable material having fibers running lengthwise about the circular side walls of the cup-shaped body and also from the circular side walls into an end wall of the cup formed by the body are provided. As a means for preventing fracture in the beak of the shuttle, a curved steel plate member 384 having suitable perforations or dovetailed teeth along its inner edge is inserted while molding the shuttle. The joint between the exposed portion of the beak member 384 and the resin material of the shuttle body are so arranged that the thread in passing from the beak onto the resinous material will not be caught or frayed in the joint. The exposed portion of the beak member 384, therefore, is sufficiently enlarged to spread the needle loop over the resinous portion of the shuttle and below the base of the beak member, the member being reduced in width so as to be covered by wedge-shaped portions of the resinous body. The beak member is also formed with an outer rib merging with the outer circumferential line of the shuttle body to provide a wearing surface engaged by a groove in the raceway 382.

To retain the thread case from rotation, a hinged retaining arm 386 (see Fig. 16) is arranged to swing downwardly and to be locked into engagement with a projecting nose portion of the thread case. The lower end of the arm 386 is recessed to receive a slotted block 388 of resinous material similar to that in the shuttle body, the slot in the block engaging the nose of the thread case. The heater for the shuttle indicated at 390 is secured in a plate 392 arranged to conduct heat to the raceway 382 and to the thread case 214. The synthetic resinous material which comprises the shuttle body and the retaining block 388 acts to prevent sudden cooling or heating of the thread supply in the thread case so as to avoid deterioration of the wax with which the thread is impregnated and to effect a more event heat distribution. The synthetic resin thread engaging surfaces of the shuttle and thread case retainer further facilitate easy and uniform passage of each needle loop over the thread case due to the ease with which the resin receives a high polish.

To reduce still further the effects of sudden heating or cooling of the thread in the supply of the thread case, the supply is wound on a bobbin reel of conventional form, shown on a bobbin winder for the machine in Figure 16 at 389, after being removed from the thread case, which bobbin reel also is composed of synthetic resin material, the side flanges of the reel acting to retard the flow of heat towards or from the thread wound thereon.

In order to lighten the construction of the moving parts in the mechanisms for actuating the needle, awl and shuttle which include cam actuated levers 394 (Figs. 6 and 16) having gear tooth segmental portions 396, the free ends of the levers are composed of synthetic resin material and the main bodies of the levers are composed of light alloy metal containing aluminum. By constructing the levers in this manner, it is possible to use an aluminum alloy where for use as a gear segment this material ordinarily can not be used successfully due to its lack of durability under impact and wear. The synthetic resin portions are molded to the alloy portions in any convenient manner as by providing perforated or toothed flanges along the free ends of the alloy portions of the levers.

The cam levers 394 are fulcrumed on a shaft 398 at the rear of the machine and are provided with cam follower rolls between the fulcrum shaft and the geared portions thereof. The cams 230 which are also formed of synthetic resinous material have closed slots or grooves to receive the follower rolls. The slots or grooves are of a width such that during operation of the machine either before the machine is started or after the machine has been operated sufficiently to cause the follower rolls to expand somewhat from heat, the rolls are actually of larger diameter than the width of the slots. With such dimensions, the resiliency of the resin material in the cams still permits the passage of the roll along the slot without prohibitive effort so long as the difference in size is not greater than a few thousandths of an inch. With such an arrangement, it is possible to reduce the expense of careful workmanship during manufacture, and the resulting machine is quieter in operation than heretofore due to the noise absorbing characteristics of the resinous material.

As a still further means for reducing vibration and noise in the present machine, the auxiliary take-up 218 is also composed of synthetic resin material. During the sewing operation, the auxiliary take-up is intermittently pulled down by the tension on the thread against a fixed stop 399 (Fig. 5) on the machine frame. With the use of synthetic resin material in the auxiliary take-up, the impacts and tendency to rebound are substantially reduced when the auxiliary is pulled against the fixed stop. The quality of the seam is thereby improved as a result of a greater accuracy in handling the thread.

The bobbin winder includes a threaded bobbin supporting spindle 400 having a bobbin securing nut 402 for holding the bobbin 389 against a circular threaded enlargement at one end of the spindle 400. The threaded enlargement on the spindle closes one end of a threaded sleeve 404 forming one member of a slip clutch connecting the spindle 400 with a winder shaft 406 rotatable in a bearing sleeve 408. One end of the shaft 406 is received within a shouldered end of the sleeve 404 and is provided with a disk-shaped head against which is pressed a button 410 by means of a spring 412 received within the sleeve 404. The outer surface of the sleeve 404 is roughened by knurling to assist the operator in holding the sleeve stationary while the shaft 406 continues to rotate so that the bobbin retaining nut 402 may be removed conveniently and an empty bobbin substituted for a filled one. The shaft 406 also carrries a pulley 414 for a belt 416 which is driven by the pulley 62 on the counter shaft 56 (see Fig. 4). The force of the spring 412 is sufficient to cause rotation of the spindle 400 while the bobbin is being wound, but is insufficient when the sleeve is gripped with ordinary force by the hand of the operator. In order to keep the winder belt 416 tight, the bearing sleeve 408 has connected with it a right angle trunnion 418 (see also Fig. 2). The trunnion 418 is rotatably supported in a bearing 420 secured to the frame of the machine and has at its end opposite to the bearing sleeve 408 an arm in which is mounted a spring pressed plunger 422 engaging a fixed portion on the machine frame.

Certain features of the invention herein disclosed form the subjects matter of divisional applications, as follows: Serial No. 389,516, filed April 21, 1941, on which Patent No. 2,293,734 was granted August 25, 1942, relating to a bobbin winder; Serial No. 416,228, filed October 23, 1941, relating to certain features of the driving and stopping and presser foot lifting mechanisms; and Serial No. 416,229, filed October 23, 1941, relating to the feeding and work grooving knife mechanisms.

Other features of the invention herein disclosed form the subjects matter of present inventor's applications Serial No. 269,566, filed April 24, 1939, on which Patent No. 2,219,308 was granted October 29, 1940, relating to loop takers; Serial No. 272,776, filed May 10, 1939, on which Patent No. 2,253,619 was granted October 26, 1941, relating to actuating cams and levers; and Serial No. 275,942, filed May 26, 1939, on which Patent No. 2,250,953 was granted July 29, 1941, relating to an auxiliary take-up.

The nature and scope of the invention having been indicated and a particular embodiment of the invention having been described, what is claimed is:

1. A shoe sewing machine having, in combination, a main supporting frame of generally rectangular cross section having spaced vertical posts, stitch-forming devices carried by the main frame and exposed at the front of the frame, a horizontal sewing shaft in the upper part of the frame, driving means in the lower part of the frame, pulleys and belts at one side of the frame connecting the driving means and the sewing shaft, a front and rear enclosing cover structure supported directly by the vertical frame posts and arranged to extend laterally beyond the frame at said side, and a separate end plate secured to the laterally extending portions of the front and rear cover structure to form a compartment enclosing the driving pulleys and belts at said side of the frame.

2. A shoe sewing machine having, in combination, a main supporting frame of generally rectangular cross-section having spaced vertical posts, stitch forming devices carried by the main frame and exposed at the front of the frame, a horizontal sewing shaft in the upper part of the frame, driving means in the lower part of the frame, pulleys and belts at both sides of the frame connecting the driving means and the sewing shaft, a front and rear enclosing cover structure supported directly by the vertical frame posts, and arranged to extend laterally beyond the frame at both sides, separate end plates secured to the laterally extending portions of the front and rear cover structure to form compartments at the sides of the frame, and fastenings arranged in parallel lines for attaching the cover structure to the frame and other fastenings arranged in lines spaced from the lines of first-mentioned fastenings for securing the end plates to the cover structure to enable removal of the end plates without removing the fastenings for the front and rear cover structure.

3. A shoe sewing machine having, in combination, a main supporting frame of generally rectangular cross section having spaced vertical posts, stitch forming devices carried by the main frame and exposed at the front of the frame, a front and rear enclosing cover structure supported directly by the vertical frame posts and arranged to extend laterally beyond the frame, a separate end plate secured to the laterally extending portions of the front and rear cover structure to form a driving compartment at the side of the frame, and a line of fastenings for securing the cover structure to the frame, said front and rear cover structure including a forwardly swinging door hinged about a vertical axis outside the line of attachment for the cover structure on the frame to render the stitch-forming devices and a driving compartment accessible when the door is swung open.

4. A shoe sewing machine having, in combination, a main supporting frame of generally rectangular cross section having spaced vertical posts, stitch forming devices carried by the main frame and exposed at the front of the frame, a front and rear enclosing cover structure supported directly by the vertical frame posts, and arranged to extend laterally beyond the frame, separate end plates secured to the laterally extending portions of the front and rear cover structure to form compartments at either side of the frame, separate parallel lines of fastenings to secure the cover structure to the frame, said front and rear cover structure including a pair of forwardly swinging doors hinged about vertical axes outside the lines of attachment for the cover structure on the frame to render the stitch-forming devices and the driving compartments accessible when the doors are swung open.

5. A shoe sewing machine having, in combination, a main supporting frame of generally rectangular cross section having spaced vertical posts, stitch forming devices carried by the main frame and exposed at the front of the frame, a front and rear enclosing cover structure supported directly by the vertical frame posts, lighting means mounted within the cover structure to illuminate the point of operation of the stitch-forming devices, and a forwardly swinging door hinged about a vertical axis and formed with a perforated flange arranged to protect the lighting means when the door is swung to closed position.

6. A shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, a wax pot fastened to the under side of the shelf inside the cover structure, and a thread supply device also secured to the shelf beneath the supporting surface thereof to permit attachment of the shelf, wax pot and thread supply device as a unit during construction of the machine.

7. A shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, a wax pot fastened to the under side of the shelf inside the cover structure, and a forwardly and downwardly swinging wax pot enclosing shield arranged when opened to expose the wax pot and to extend into a position normally occupied by the operator while presenting a shoe to the machine.

8. A shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, a wax pot heating unit and thread guides secured to the shelf inside the cover structure, a vertical rod depending from the shelf, a wax pot releasably clamped to the rod in a position surrounding the heating unit, and a drip tray slidingly mounted beneath the shelf and wax pot to receive particles of wax or foreign materials dropping from the wax pot or stitch-forming devices.

9. A shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, a wax pot heating unit and thread guides secured to the shelf inside the cover structure, a vertical rod depending from the self, a wax pot releasably clamped to the rod in a position surrounding the heating unit, a drip tray slidingly mounted beneath the shelf and wax pot to receive particles of wax or other materials dropping from the wax pot or stitch forming devices, and a thread supply spindle supported on the tray.

10. A shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, a wax pot heating unit and thread guides secured to the shelf inside the cover structure, a vertical rod depending from the shelf, a wax pot releasably clamped to the rod in a position surrounding the heating unit, a drip tray slidingly mounted beneath the shelf and wax pot to receive particles of wax or other material dropping from the wax pot or stitch forming devices, a thread supply spindle supported on the tray, and a forwardly and downwardly swinging shield arranged when in closed position to prevent withdrawal of the drip tray.

11. A curved needle shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, and a holder mounted on the shelf and provided with one or more arcuate depressions for receiving a number of curved needles or awls and retaining them in parallel relation to each other.

12. A curved needle shoe sewing machine having, in combination, a main supporting frame, stitch forming devices carried by the frame arranged to project from the front of the frame, an enclosing cover structure surrounding the stitch forming devices and frame, a shelf secured to the frame inside the cover structure beneath the stitch forming devices and formed with a supporting surface outside the cover structure at the front of the machine, and an elongated holder movably disposed beneath the shelf and provided with one or more arcuate depressions for receiving curved needles and awls and retaining them in parallel relation to each other, separate depressions being provided for needles and awls with the needle depressions arranged to support the needles with the central portions thereof substantially lengthwise of the longest dimension of the holder and the awls with the central portions thereof crosswise to the longest dimension of the holder.

13. A shoe sewing machine having, in combination, a main supporting frame, stitch forming devices carried by the frame and exposed at the front thereof, and an enclosing cover structure for the machine including a pair of contiguous forwardly swinging doors hinged along their remote edges about vertical axes to render the stitch forming devices accessible when the doors are swung open and formed with cut-away sections along their contiguous edges to expose the portions of the stitch-forming devices engaging the work at the point of operation of the stitch-forming devices when the doors are closed.

14. A shoe sewing machine having, in combination, a main supporting frame, stitch forming devices carried by the frame and exposed at the front thereof, a light at one side of the stitch-forming devices to illuminate the point of operation thereof, and an enclosing cover structure for the machine having a projecting portion disposed above the light and including a forwardly swinging door hinged about a vertical axis to render the stitch forming devices accessible when the door is swung open and provided with a forwardly projecting perforated flange engaging the projecting portion of the cover structure to protect the light when the door is closed.

15. A shoe sewing machine having, in combination, a main supporting frame, stitch forming devices carried by the frame and exposed at the front thereof, a pair of lights at opposite sides of the stitch-forming devices to illuminate the point of operation thereof and an enclosing cover structure for the machine including a pair of contiguous forwardly swinging doors hinged about vertical axes along their remote edges to the frame to render the stitch-forming devices accessible when the doors are swung open and formed with cut-away sections along their contiguous edges to expose the point of operation of the stitch-forming devices and with forwardly projecting perforated flanges to protect the lights when the doors are in closed positions.

16. A shoe sewing machine having, in combination, a main supporting frame of generally rectangular cross section having spaced vertical posts, a main sewing shaft rotatably mounted in the frame with its ends projecting laterally from the sides of the frame, a counter-shaft rotatably mounted in the frame parallel to the sewing shaft with its ends also projecting laterally from between the posts, low and high speed driving belts between the ends of the sewing and counter shafts, stitch forming devices actuated by the sewing shaft and exposed at the front of the frame, a front and rear enclosing cover structure attached directly to the vertical frame posts and arranged to extend laterally beyond the ends of the sewing and counter shafts, and separate end plates secured to the laterally extending portions of the front and rear cover structure to form separate compartments for the high and low speed driving belts.

17. A shoe sewing machine having, in combination, a main supporting frame of generally rectangular cross-section having spaced vertical posts, stitch-forming devices carried by the main frame and exposed at the front of the frame, a front and rear enclosing cover structure supported directly by the vertical frame posts and arranged to extend laterally beyond the frame, separate end plates secured to the laterally extending portions of the front and rear cover structure to form driving compartments at the sides of the frame, a sewing shaft rotatable in said frame and projecting laterally beyond the sides of the frame into the driving compartments, cams between the ends of the shaft for actuating the stitch-forming devices, a low speed driving and stopping mechanism at one end of the shaft arranged to be exposed when one of said end plates is removed, and a high speed driving mechanism at the other end of the shaft arranged to be exposed when the other of said end plates is removed.

18. A sewing machine having, in combination, a main frame, of generally rectangular cross section, having spaced vertical supporting posts, a main sewing shaft rotatably mounted in the frame with its ends projecting at the sides of the frame laterally beyond the posts, stitch-forming devices actuated thereby and exposed at the front of the frame, driving and stopping mechanism having high and low speed driving mechanisms at the ends of the sewing shaft which project beyond the main frame, a countershaft mounted in the frame with its ends also projecting at the sides of the frame laterally between the posts, pulleys on the counter-shaft and on the high and low speed driving mechanisms outside the main frame, driving belts connecting said pulleys, a front and rear enclosing cover structure on the frame arranged to extend laterally beyond the ends of the sewing and counter-shafts, and separate end plates secured to the laterally extending cover portions to form enclosing compartments for the high and low speed driving mechanisms and the driving belts therefor.

OTTO R. HAAS.